Patented Sept. 1, 1931

1,821,036

UNITED STATES PATENT OFFICE

ALBRECHT SCHMIDT, OF HOCHST-ON-THE-MAIN, GERMANY, ASSIGNOR, BY MESNE ASSIGNMENTS, TO WINTHROP CHEMICAL COMPANY, OF NEW YORK, N. Y., A CORPORATION OF NEW YORK

PREPARATION FOR REPELLING GNATS AND SIMILAR INSECTS

No Drawing. Application filed September 20, 1927, Serial No. 220,847, and in Germany September 20, 1926.

My present invention relates to preparations for repelling gnats and similar insects.

Certain substances in particular essential oils, are known to have a repelling action on gnats, mosquitoes, midges, culicidæ and similar insects, so that when applied to the skin, they serve to protect the parts of the skin so treated from the bite or sting of these insects. Hitherto, the essential oils, or mixtures thereof have been used for this purpose either as such or in the form of a solution in ether or alcohol, that is to say, the parts of the skin which are particularly exposed to attack by the insects have been treated with the liquid oil, or with the oil in solution.

It is desirable that preparations for the purpose in question should retain their prophylactic action for some time after their application to the skin; for instance, when the preparation is applied for the purpose of preventing attack by the insects during the hours of repose, it is highly desirable that the preparation should retain its activity at least for several hours, if not for the whole night. These requirements are not fulfilled in a wholly satisfactory manner by application of the essential oils in the manner hitherto recommended.

My invention is based on the observation that the action of essential oils and other vegetable extracts in repelling moths has an essentially longer duration if the material is made into the form of an ointment and applied to the skin in this form. The invention accordingly consists in a manufacture of preparations which repel gnats and like insects by bringing an essential oil of any vegetable origin (or a mixture of two or more such oils), or a vegetable extract effective against such insects, into the form of an ointment or salve by incorporating it in a basis which is applicable in the preparation of ointments, for example lanoline, vaseline, gum-tragacanth, carrageen moss gum or like mucilaginous material, or an aqueous thickening agent. The preparations so obtained are considerably superior, in comparison with the ethereal oils applied as such or in the form of a solution, as regards the duration of their efficacy in repelling the insects when applied to the skin.

If instead of fatty substances there are used as the basis for the ointment aqueous thickening agents, such as the mucilage obtained from gum tragacanth or carrageen moss, the preparations so made have the further particular property that they produce, even after the bite of the insect has occurred, an anæsthetic action and a cool feeling on the skin, so that the effects of the bite soon disappear. The new ointments contain at least 8% of essential oils.

The following examples illustrate the invention, the parts being by weight:—

1. An ointment having a very good repellant action may for instance be prepared my mixing 92 parts of mucilage obtained from carrageen moss, 5 parts of cedar-oil, and 4 parts of juniper-oil.

2. Another preparation of good efficiency is obtained by mixing 88 parts of mucilage obtained from tragacanth, 5 parts of templin-oil, 2 parts of juniper-oil, 5 parts of thuja (arbor vitæ)-oil.

I claim:

1. A preparation for repelling gnats and similar insects, consisting of an ointment composed of 88 parts of mucilage obtained from gum tragacanth, 5 parts of templin oil, 2 parts of juniper-oil and 5 parts of thuja- (arbor vitæ)-oil.

2. Preparations for repelling gnats and similar insects consisting of an ointment containing at least 8% of at least one essential oil selected from the group consisting of cedar-oil, juniper-oil, templin-oil and thuja (arbor vitæ)-oil, the remainder being an aqueous thickening agent obtained from a vegetable mucilage as ointment basis.

3. Preparations for repelling gnats and similar insects consisting of an ointment containing at least 8% of at least one essential oil selected from the group consisting of cedar-oil, juniper-oil, templin-oil, and thuja (arbor vitæ)-oil, the remainder being a mucilage obtained from gum tragacanth as ointment basis.

In testimony whereof, I affix my signature.

ALBRECHT SCHMIDT.